(12) United States Patent
Kalki et al.

(10) Patent No.: US 11,868,372 B1
(45) Date of Patent: Jan. 9, 2024

(54) AUTOMATED HIERARCHY DETECTION FOR CLOUD-BASED ANALYTICS

(71) Applicant: Amazon Technologies, Inc., Seattle, WA (US)

(72) Inventors: Santosh Kalki, Seattle, WA (US); Swaminathan Sivasubramanian, Sammamish, WA (US); Srinivasan Sundar Raghavan, Mercer Island, WA (US); Timothy Andrew Rath, Des Moines, WA (US); Amol Devgan, Seattle, WA (US); Mukul Vijay Karnik, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/503,235

(22) Filed: Sep. 30, 2014

Related U.S. Application Data

(60) Provisional application No. 62/015,308, filed on Jun. 20, 2014.

(51) Int. Cl.
*G06F 16/28* (2019.01)
(52) U.S. Cl.
CPC .................................. *G06F 16/283* (2019.01)
(58) Field of Classification Search
CPC .... G06F 17/30592; G06F 17/30; G06F 16/28; G06F 16/283
USPC ........................................................ 707/607
See application file for complete search history.

(56) References Cited

U.S. PATENT DOCUMENTS

| | | | |
|---|---|---|---|
| 5,987,467 | A | 11/1999 | Ross et al. |
| 6,137,493 | A | 10/2000 | Kamimura et al. |
| 6,424,967 | B1 | 7/2002 | Johnson et al. |
| 6,456,997 | B1 | 9/2002 | Shukla |
| 6,493,718 | B1 | 12/2002 | Petculescu et al. |
| 6,535,872 | B1 | 3/2003 | Castelli et al. |

(Continued)

FOREIGN PATENT DOCUMENTS

| | | |
|---|---|---|
| CN | 103281376 A | 9/2013 |
| CN | 103793422 A | 5/2014 |

(Continued)

OTHER PUBLICATIONS

European Notice of Allowance dated Dec. 13, 2018, Patent Application No. 15733982.1, filed Jun. 19, 2015, 56 pages.

(Continued)

*Primary Examiner* — Hosain T Alam
*Assistant Examiner* — Tracy M McGhee
(74) *Attorney, Agent, or Firm* — Davis Wright Tremaine LLP

(57) ABSTRACT

A platform for data analytics may be provided in a hosted environment on a multi-tenant system. The platform provider may also provide transactional processing services. Data obtained from processing the transactional services may be stored in an n-dimensional cube with which analytics may be performed. A dimension and hierarchy model may be identified based on correlations between hierarchy dimensions and levels in a dataset, or in schema and queries related to the dataset. Correlations may be further based on data received from a data stream. Priority for calculating a hierarchy may be based on data received from a data stream.

20 Claims, 10 Drawing Sheets

(56) References Cited

U.S. PATENT DOCUMENTS

| | | | |
|---|---|---|---|
| 6,609,123 | B1 | 8/2003 | Cazemier et al. |
| 6,684,216 | B1 | 1/2004 | Duliba et al. |
| 6,691,140 | B1 | 2/2004 | Bogrett |
| 6,707,454 | B1 | 3/2004 | Barg et al. |
| 7,272,613 | B2 | 9/2007 | Sim et al. |
| 7,284,011 | B1 | 10/2007 | Narayanaswamy et al. |
| 7,366,730 | B2 | 4/2008 | Greenfield et al. |
| 7,761,407 | B1 | 7/2010 | Stern |
| 7,954,090 | B1 | 5/2011 | Qureshi et al. |
| 8,166,042 | B1 | 4/2012 | Praun et al. |
| 8,245,290 | B2 | 8/2012 | Hosoda |
| 8,280,853 | B1 | 10/2012 | Lai et al. |
| 8,341,111 | B2 | 12/2012 | Patil et al. |
| 8,346,711 | B2 | 1/2013 | Al-Duwaish et al. |
| 8,417,723 | B1 | 4/2013 | Lissack et al. |
| 8,447,722 | B1 | 5/2013 | Ahuja et al. |
| 8,566,749 | B2 | 10/2013 | Kashik et al. |
| 8,683,468 | B2 | 3/2014 | Breternitz et al. |
| 8,732,118 | B1 | 5/2014 | Cole et al. |
| 9,229,997 | B1 | 1/2016 | Raghavan et al. |
| 9,286,391 | B1 | 3/2016 | Dykstra et al. |
| 9,535,970 | B2 | 1/2017 | Mohan |
| 9,824,133 | B1 | 11/2017 | Kalki et al. |
| 9,882,949 | B1 | 1/2018 | Kalki et al. |
| 2002/0194163 | A1 | 12/2002 | Hopeman et al. |
| 2003/0088447 | A1 | 5/2003 | Desbiens et al. |
| 2003/0115194 | A1 | 6/2003 | Pitts et al. |
| 2003/0200191 | A1 | 10/2003 | Pao et al. |
| 2004/0034666 | A1 | 2/2004 | Chen |
| 2004/0138932 | A1 | 7/2004 | Johnson et al. |
| 2004/0162852 | A1 | 8/2004 | Qu et al. |
| 2004/0215626 | A1 | 10/2004 | Colossi et al. |
| 2004/0236767 | A1 | 11/2004 | Soylemez et al. |
| 2004/0243593 | A1* | 12/2004 | Stolte .................. G06F 16/212 |
| 2005/0055289 | A1 | 3/2005 | Mehldahl |
| 2005/0065910 | A1 | 3/2005 | Welton et al. |
| 2005/0120018 | A1 | 6/2005 | Whitney |
| 2005/0131924 | A1 | 6/2005 | Jones |
| 2005/0210052 | A1 | 9/2005 | Aldridge |
| 2006/0053136 | A1 | 3/2006 | Ashiri |
| 2006/0085444 | A1* | 4/2006 | Sarawgi ............. G06F 16/2454 |
| 2006/0112976 | A1 | 6/2006 | Reiche et al. |
| 2006/0122877 | A1 | 6/2006 | Yazdani et al. |
| 2006/0200448 | A1 | 9/2006 | Edmunds et al. |
| 2006/0288046 | A1 | 12/2006 | Gupta et al. |
| 2007/0022120 | A1 | 1/2007 | Huang et al. |
| 2008/0040309 | A1 | 2/2008 | Aldridge |
| 2008/0201358 | A1 | 8/2008 | Calusinski |
| 2008/0243778 | A1 | 10/2008 | Behnen et al. |
| 2008/0288524 | A1 | 11/2008 | Dumitru et al. |
| 2009/0006788 | A1 | 1/2009 | Hunt et al. |
| 2009/0063752 | A1 | 3/2009 | Dow |
| 2009/0144213 | A1 | 6/2009 | Patil et al. |
| 2009/0249125 | A1 | 10/2009 | Bhatawdekar et al. |
| 2009/0254583 | A1* | 10/2009 | Kenney .................. G06F 16/283 707/999.102 |
| 2009/0262131 | A1 | 10/2009 | Suntinger et al. |
| 2009/0282369 | A1 | 11/2009 | Jones |
| 2009/0287666 | A1 | 11/2009 | DeKimpe et al. |
| 2009/0327330 | A1 | 12/2009 | Abouzied et al. |
| 2010/0057700 | A1* | 3/2010 | Williamson .......... G06F 16/283 707/E17.014 |
| 2010/0153064 | A1 | 6/2010 | Cormode et al. |
| 2010/0153341 | A1 | 6/2010 | Driesen et al. |
| 2010/0287146 | A1 | 11/2010 | Skelton et al. |
| 2011/0161379 | A1 | 6/2011 | Grund et al. |
| 2011/0213751 | A1 | 9/2011 | Iorio et al. |
| 2011/0261049 | A1* | 10/2011 | Cardno .................. G06Q 10/10 345/419 |
| 2011/0261202 | A1 | 10/2011 | Goldstein |
| 2011/0314523 | A1 | 12/2011 | Blumenfeld et al. |
| 2011/0320398 | A1 | 12/2011 | Abdellatif Abouzeid et al. |
| 2012/0239596 | A1 | 9/2012 | Lee et al. |
| 2012/0316916 | A1 | 12/2012 | Andrews et al. |
| 2013/0125057 | A1 | 5/2013 | Kashik et al. |
| 2013/0254838 | A1 | 9/2013 | Ahuja et al. |
| 2013/0304714 | A1* | 11/2013 | Lee .................. G06F 9/466 707/703 |
| 2013/0339291 | A1 | 12/2013 | Hasner |
| 2014/0101093 | A1 | 4/2014 | Lanphear et al. |
| 2014/0279839 | A1 | 9/2014 | Balzar et al. |
| 2014/0297652 | A1 | 10/2014 | Stevens et al. |
| 2015/0134626 | A1 | 5/2015 | Theimer et al. |
| 2015/0134797 | A1 | 5/2015 | Theimer et al. |
| 2015/0310082 | A1 | 10/2015 | Han et al. |
| 2015/0370883 | A1 | 12/2015 | Kalki et al. |
| 2017/0116552 | A1 | 4/2017 | Deodhar et al. |

FOREIGN PATENT DOCUMENTS

| | | |
|---|---|---|
| JP | H09265479 A | 10/1997 |
| JP | 2002108896 A | 4/2002 |
| JP | 2003006194 A | 1/2003 |
| JP | 2009512909 A | 3/2009 |
| JP | 2013520738 A | 6/2013 |
| JP | 2014002792 A | 1/2014 |
| WO | 2005111611 A2 | 11/2005 |

OTHER PUBLICATIONS

Canadian Notice of Re-Allowance dated May 1, 2019, Patent Application No. 2,952,882, filed Jun. 19, 2015, 1 page.

Korean Decision of Patent Grant dated Apr. 30, 2019, Patent Application No. 10-2017-7001694, filed Jun. 19, 2015, 2 pages.

Australian Notice of Acceptance for Patent Application dated Aug. 23, 2018, Patent Application No. 2015276830, filed Jun. 19, 2015, 3 pages.

Canadian Notice of Allowance dated Oct. 3, 2018, Patent Application No. 2,952,882, filed Jun. 19, 2015, 1 page.

Canadian Office Action dated Aug. 14, 2018, Patent Application No. 2,952,877, filed Jun. 19, 2015, 5 pages.

European Communication pursuant to Article 94(3) EPC dated Jun. 1, 2018, Patent Application No. 15733982.1, filed Jun. 19, 2015, 5 pages.

Japanese Decision to Grant dated Sep. 3, 2018, Patent Application No. 2017-519468, filed Jun. 19, 2015, 2 pages.

Korean Office Action dated Jul. 9, 2018, Patent Application No. 10-2017-7001694, filed Jun. 19, 2015, 4 pages.

Singaporean Notice of Eligibility for Grant dated Jul. 10, 2018, Patent Application No. 11201610603T, filed Jun. 19, 2015, 5 pages.

Canadian Office Action dated Jul. 12, 2019, Patent Application No. 2,952,877, filed , 5 pages.

Chinese First Office Action dated Jul. 1, 2019, Patent Application No. 201580032274.1, filed Jun. 19, 2015, 4 pages.

Chinese Notice of Allowance dated Dec. 31, 2019, Patent Application No. 201580032274.1, filed Jun. 19, 2015, 4 pages.

European Communication pursuant to Article 94(3) EPC dated Apr. 15, 2021, Patent Application No. 15739066.7, 5 pages.

Aguilera et al., "A Practical Scalable Distributed B-Tree," Proceedings of the VLDB Endowment 1(1):598-609, Aug. 2008.

Authors et al., "A Method for Incrementally Updating a Multi-Dimensional Data Cache," An IP.com Prior Art Database Technical Disclosure, May 21, 2007, 7 pages.

Authors et al., "Dynamic, Interactive Creation of OLAP Dimensions," An IP.com Prior Art Database Technical Disclosure, Aug. 13, 2009, 8 pages.

Dehne et al., "Parallel Real-Time Olap on Multi-Core Processors," 12th IEEE/ACM Int'l Symposium, Cluster, Cloud and Grid Computing, May 13, 2012, 23 pages.

Du Mouza et al., "SD-Rtree: A Scalable Distibuted Rtree," IEEE 23rd International Conference, Data Engineering, Apr. 2007, 19 pages.

Eltabakh, "OLAP & Data Mining," Worcester Polytechnic Institute (WPI), Apr. 2012, http://web.cs.wpi.edu/~cs561/s12/Lectures/IntegrationOLAP/OLAPandMining.pdf, 38 pages.

Goil et al., "A Parallel Scalable Infrastructure for OLAP and Data Mining," IEEE Int'l Symposium Proceedings, Database Engineering And Applications, Aug. 1999, 9 pages.

(56) References Cited

OTHER PUBLICATIONS

International Preliminary Report on Patentability dated Dec. 29, 2016, International Patent Application No. PCT/US2015/036834, filed Jun. 19, 2015, 13 pages.
International Preliminary Report on Patentability dated Dec. 29, 2016, International Patent Application No. PCT/US2015/036835, filed Jun. 19, 2015, 10 pages.
International Search Report and Written Opinion dated Oct. 23, 2015, International Patent Application No. PCT/US2015/036835, filed Jun. 19, 2015, 12 pages.
International Search Report and Written Opinion dated Sep. 23, 2015, International Patent Application No. PCT/US2015/036834, filed Jun. 19, 2015, 18 pages.
Singapore Written Opinion dated Aug. 27, 2017, Patent Application No. 11201610603T, filed Jun. 19, 2015, 6 bages.
Sowell et al., "Minuet: A Scalable Distributed Multiversion B-Tree," Proceedings of the VLDB Endowment 5(9):884-895, May 2012.
Zhou, "Parallel Real-Time Olap on Cloud Platforms," School of Computer Science at Carleton University, Thesis, Nov. 2013, 110 pages.

* cited by examiner

AUTOMATED HIERARCHY DETECTION FOR CLOUD-BASED ANALYTICS

CROSS-REFERENCES TO RELATED APPLICATIONS

This application claims benefit under 35 U.S.C. § 119(e) of U.S. Provisional Patent Application No. 62/015,308, filed Jun. 20, 2014, the contents of which are hereby incorporated by reference in its entirety.

This application is also related to co-pending application entitled "EMBEDDABLE CLOUD ANALYTICS," U.S. Provisional Patent Application No. 62/015,302, filed on Jun. 20, 2014, as well as co-pending application entitled "REAL-TIME HOSTED SYSTEM ANALYTICS," U.S. Provisional Patent Application No. 62/015,294, filed on Jun. 20, 2014, as well as co-pending application entitled "CLOUD ANALYTICS MARKETPLACE," U.S. Provisional Patent Application No. 62/015,307, filed on Jun. 20, 2014, and co-pending application entitled "DYNAMIC CUBES FOR CLOUD-BASED ANALYTICS," U.S. Provisional Patent Application No. 62/015,312, filed on Jun. 20, 2014, which are hereby incorporated by reference in their entireties.

BACKGROUND

Data warehouse and online analytical processing ("OLAP") systems may be used to perform various functions related to data mining, reporting, and forecasting. OLAP systems may permit multidimensional analysis of data typically obtained from transactional systems, such as relational databases, and loaded into a multidimensional cube structure. The n-dimensional cube may be structured to facilitate the analysis of data according to various dimensions and hierarchies. A data analyst may determine the dimensions and hierarchies to be used and configure the multidimensional cube to reflect the chosen set of hierarchies and dimensions.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Aspects of the present disclosure may be employed to perform discovery and modeling of dimensions of hierarchies relevant to one or more data sources. Discovery and modeling of dimensions and hierarchies may be performed in conjunction with a hosted analytics platform. A hosted analytics platform, which may also be referred to as a cloud-based platform for online analytical processing, may integrate data from a wide variety of sources. These sources may include those not typically associated with conventional data warehouse systems. For example, log data generated by transactional applications also hosted by the provider of a hosted analytics platform may be incorporated into a data n-dimensional cube, perhaps being combined with transactional data from the transactional system.

In an embodiment, hierarchies may be automatically detected in data received from various sources, such as from a database management system. Such data may generally be described as transactional data, to distinguish between data points stored in an n-dimensional cube and retrieved from the n-dimensional cube for performing data analytics. Hierarchies may be detected, in some cases, without a formal definition of the relationships between dimensions and levels. Detection may be based on transactional data, as well as on schema and queries associated with the transactional data. Confluence of In some cases and embodiments, additional data from a real time stream of information may be utilized to link dimensions and levels that might be included in a hierarchy, or to prioritize computation of data points included in certain hierarchies. Real time information may include information pertaining to geography, devices, shopping patterns, scheduled events, and so on.

Figure 1:
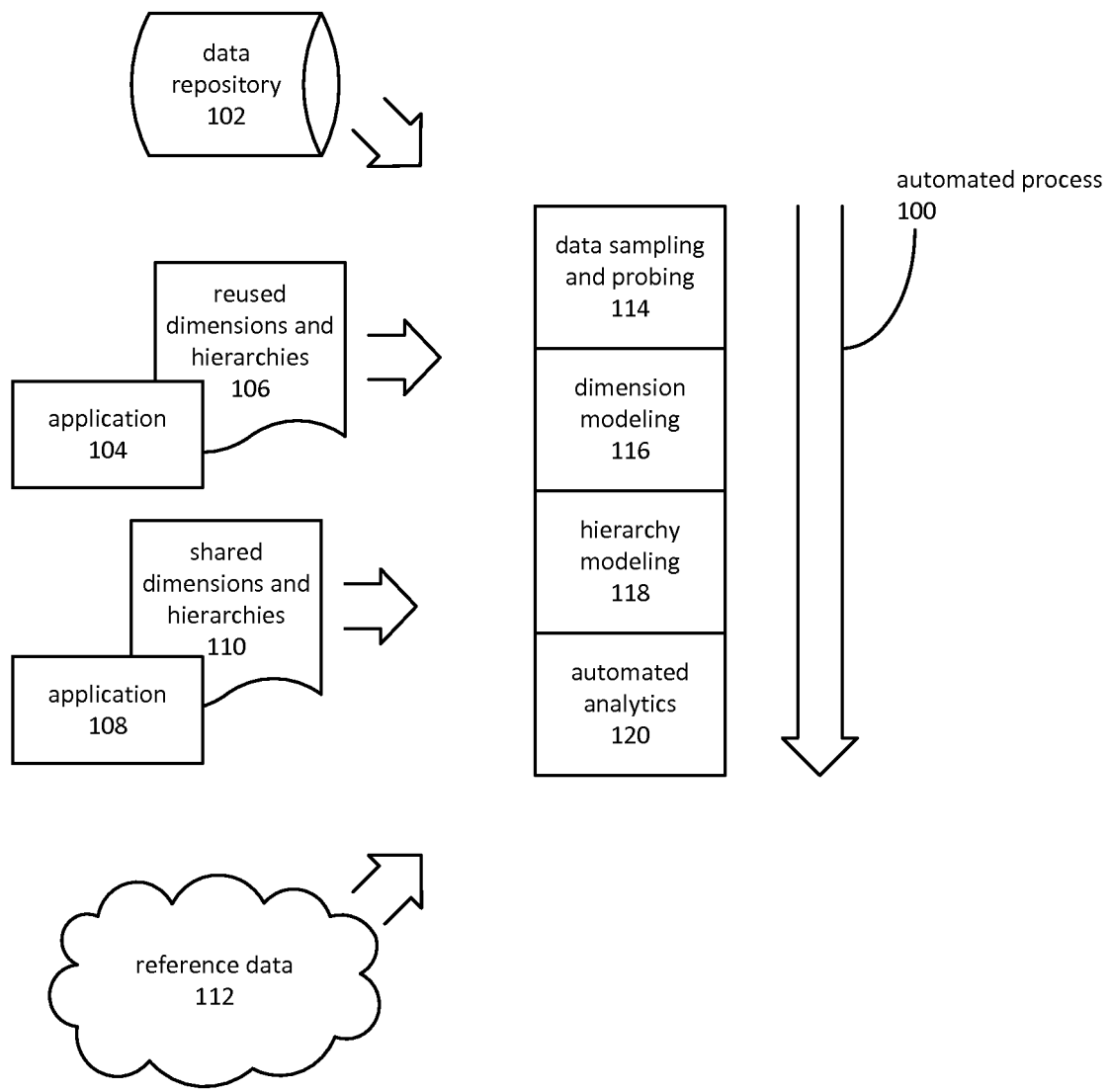
FIG. 1 is a block diagram depicting an embodiment of a system for automated discovery of dimension and hierarchy information in a cloud-based analytics platform.

FIG. 1 is a block diagram depicting an embodiment of a system for automated discovery of dimension and hierarchy information in a cloud-based analytics platform. An automated process 100 may be executed by various combinations of computer-executable instructions and circuitry. Embodiments may host automated process 100 on one or more computing nodes operating within a data center maintained by a provider of a hosted analytics system. Embodiments may further provide access to hosted data stores, such as database management systems also maintained by the provider. A hosted data store, for example, might contain transactional data on which analytics are to be performed. Transaction data, and other data on which analytics are to be performed, may be maintained in data repository 102. A data repository 102 may comprise one or more database management systems, document stores, file systems, and so forth. A process for performing analytics on data maintained in data repository 102 may comprise elements, such as modeling dimensions reflected in the data. Dimensions may reflect the type or category of data, such as time, sales, number of customers, number of employees, and so forth. Another element of performing analytics may involve modeling hierarchies of the data, such as the hierarchy "days, weeks, and months" which may be formed in the time dimension. Data maintained in a data repository 102 may be transferred to an n-dimensional cube (not shown) reflecting a modelled set of dimensions and hierarchies. Note that the terms "cube," "hypercube," and "n-dimensional cube" may be used interchangeably.

Access to transactional data by automated process 100 may be used to enable automated modeling of dimensions and hierarchies for use in analysis of the data. An automated process 100 for modeling dimensions and hierarchies may comprise the operations of data sampling and probing 114, dimension modeling 116, hierarchy modeling 118 and automated analysis 120.

Data sampling and probing may involve inspection of data from data repository 102. Data to be inspected may be extracted from data repository 102, or may be inspected in-place or through other means that minimizes the amount of data transfer that might occur during data sampling and probing 114. Inspection performed during data sampling and probing 114 may pertain to dimension modeling 116 and hierarchy modeling 118. It may include steps, such as data normalization, statistical sampling, type analysis, categorization, and so forth.

Dimension modeling 116 may comprise determining various candidates for dimensions that can be applied to the data. A model of dimensions may comprise a set of proposed dimensions. The dimensions may in some cases overlap, such as with calendar year and fiscal year. Embodiments may propose a set of dimensions based on factors, such as the degree to which the proposed dimensions fit the data, the potential usefulness of the proposed dimensions, and so on. These factors may generally be described as the fitness of the proposed model.

Hierarchy modeling 118 may comprise determining one or more hierarchies applicable to proposed dimensions. For example, if time is a proposed dimension, a proposed dimension might comprise weeks, months, and year. Another proposed dimension might comprise months and quarters. Embodiments may propose a set of dimensions based on factors, such as the degree to which the proposed hierarchies fit patterns of the data, the potential usefulness of the proposed dimensions, and so forth.

The operations of dimension modeling 116 and hierarchy modeling 118 may, in various embodiments, be performed using data sources in addition to data repository 102. These include reused dimensions and hierarchies 106. An application 104 may belong to a customer (not shown) of a hosted analytics service, and may run within the context of a hosted analytics service. Embodiments may utilize dimensions and hierarchies previously utilized by the customer, or by other users of application 104, in order to identify candidate dimensions and hierarchies. Similarity with reused dimensions and hierarchies may be employed, for example based on an assumption that previously used dimensions and hierarchies are likely to be valuable in the future. For example, embodiments might infer that time-based data that has been presented on a quarterly basis in the past might be desirably presented on a quarterly basis in the future. However, in some cases and embodiments dissimilarity with reused dimensions and hierarchies 106 may be used, based, for example, on an assumption that new insights may be gained by analysis on a different basis than was used previously. Combinations of these approaches may also be used.

The operations of dimension modeling 116 and hierarchy modeling 118 may, in various embodiments, be performed using shared dimensions and hierarchies 110. For example, an application 108 may utilize shared dimensions and hierarchies 110. The origin of shared dimensions and hierarchies 110 may be a result of performing dimensions modeling 116 and hierarchy modeling 118. These steps may, however, be performed by an entity other than a publisher of application 108. Shared dimension and hierarchies 110 may, for example, originate from third-parties other than the publisher of the application, or even the owner of the data to be analyzed. It could be the case, for example, that an owner of a similar data set makes dimension and hierarchies 110 available through a marketplace or other distribution channel.

In some embodiments, dimension and hierarchy information may be automatically extracted from various customers of hosted analytics providers. The dimension and hierarchy information that is extracted in this way may be anonymized or otherwise restricted to ensure compliance with privacy concerns.

Embodiments may also enable explicit sharing of dimension and hierarchy information. For example, a customer of a hosted analytics service might publish dimensions and hierarchies employed in its applications. These dimensions and/or hierarchies could then be imported and used as factors considered during dimension modeling 116 and hierarchy modeling 118.

Another data source that may be incorporated into dimension modeling 116 and hierarchy modeling 118 is reference data 112, which may comprise various additional data sources available to automated process 100. The additional data sources may comprise sources, such as reference databases, dictionaries, and so on. These sources may be hosted by a provider of hosted analytics services, by a customer, or they may be hosted by a third party, possibly accessible through the Internet. These sources may contain information related to taxonomy, categorization, dates and times, news, and various other types of information that may be used by embodiments to perform dimension modeling 116 and hierarchy modeling 118.

Figure 2:
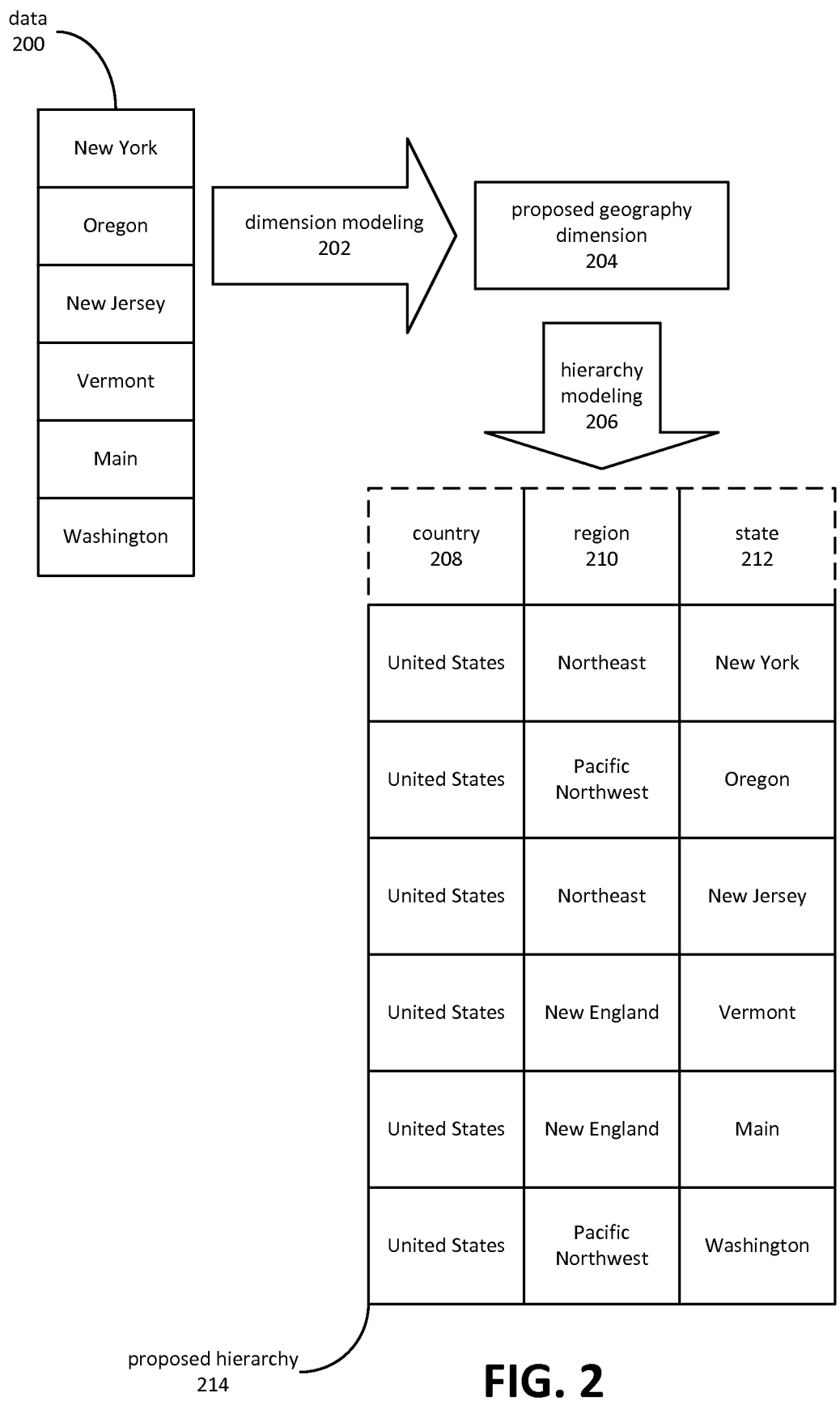
FIG. 2 is a block diagram depicting an example of dimension and hierarchy modeling as performed by various embodiments described herein.

FIG. 2 is a block diagram depicting an example of dimension and hierarchy modeling as performed by various embodiments described herein. A process for modeling dimensions and hierarchies may begin with data sampling and probing. In FIG. 2, data 200 may represent a sampled set of data, and may be based on data maintained by a hosted database service on behalf of a customer. Data 200 may correspond to streams of data, some of which may be received in real time. Examples include real time information that may be received from devices such as mobile phones, such as geographic positioning information, device identifiers, and so forth. Other forms of real time information that may be received are operational information from log files, events occurring in videogames, sales-related events such as promotions, and so on.

A dimension modeling 202 process may result in a proposed geography dimension 204 being selected as a candidate dimension for analysis. Selection of a proposed geography dimension 204, during a process of dimension modeling 202, may be based on dimensions previously selected by the same customer, dimensions previously selected by other customers, dimensions inferred based on reference data, dimensions inferred based on categorization, and other factors.

Note that although FIG. 2 depicts only one candidate dimension (geography dimension 204), additional candidate dimensions are possible. Embodiments may apply various algorithms or heuristics to propose and evaluate various candidate dimensions in order to determine which dimension candidates warrant further evaluation. Multiple candidates may be selected for use in evaluating possible hierarchy candidates, or for inclusion in an n-dimensional cube. Dimensions included in an n-dimensional cube may be used in subsequent analysis.

Selection of a candidate dimension may be based on transactional data and reference data, which may include schema and other information. In an embodiment, queries used in processing transactional data may be used to infer possible dimensions. For example, a column name in a table within a transaction database might be suggestive of a possible dimension. Schema information may be compared to additional reference data, such as data that is indicative of category or meaning, to select a possible candidate dimension.

Selection of a candidate dimension may also be based on previously used and shared dimensions, such as those dimensions commonly used in other analytics applications by the same customer, or those commonly used by other customers.

A process for hierarchy modeling 206 may result in formation of a proposed hierarchy 214. In the example of FIG. 2, data 200 may reflect a geography dimension, as indicated by proposed geography dimension 204. One possibly hierarchy for a geography dimension is proposed hierarchy 214. In this proposed hierarchy, data may be grouped according to country 208, region 210, and state 212.

Formation of a hierarchy may be based on transactional data and reference data. For example, column names, SQL queries, and other information used in a transactional context may be applied to select candidate hierarchies. For example, a SQL query may contain a GROUP BY clause that is suggestive of a hierarchy.

Automated formation of a hierarchy may also be based on previously used and shared hierarchies. These may be hierarchies commonly used in other analytics applications by the same customer, or those commonly used by other customers.

Figure 3A:
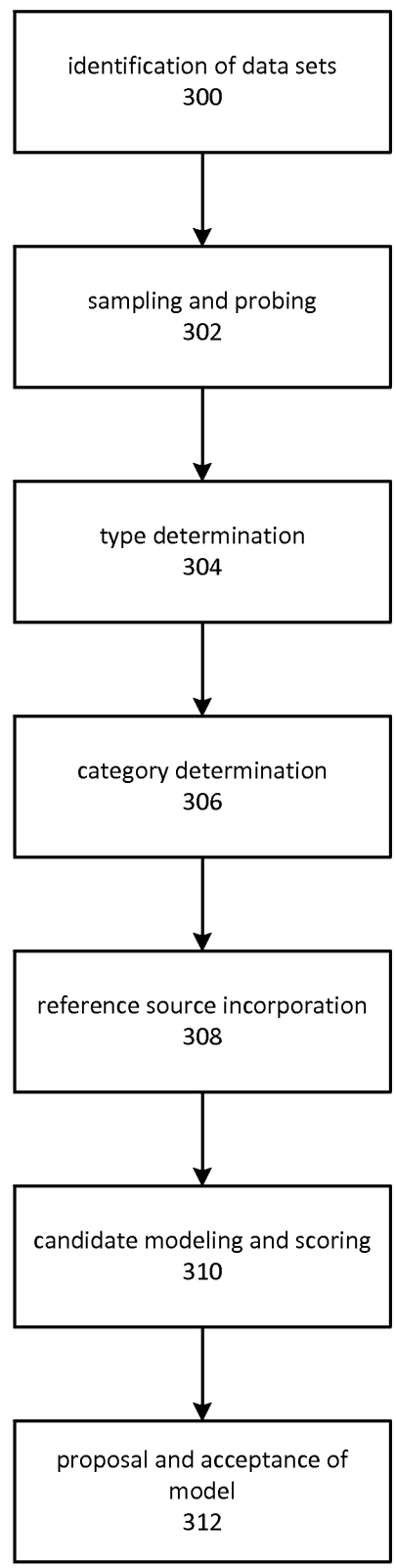
FIG. 3A is a flowchart depicting an embodiment of a process for automated hierarchy detection in a hosted analytics environment.

FIG. 3A is a flowchart depicting a process for automated hierarchy detection in a hosted analytics environment. Although depicted as a sequence of operations, those of ordinary skill in the art will appreciate that the depicted order should not be construed as limiting the scope of the present disclosure and that at least some of the depicted operations may be altered, omitted, reordered, supplemented with additional operations, or performed in parallel. Embodiments of the depicted process may be implemented using various combinations of computer-executable instructions executed by a computing system, such as the computing systems described herein.

Operation 300 depicts identification of data sets that are candidates for inclusion in a hosted analytics application. Candidate data sets may be identified based on input by a publisher, developer, or user of a hosted analytics application. Candidate data sets may also be inferred in some instances, based on patterns of use by a publisher, developer, or user of a hosted application.

Operation 302 depicts sampling and probing of an identified data set. This may include determination of an appropriate sampling and/or probing strategy based on location of the data. In some cases, a hosted analytics provider may also host a publisher, developer, or user's transactional data (i.e., data in the identified data sets to be subject to analytics). In such cases, sampling and probing may be performed in situ, which may be used in some circumstances to reduce data transfer, improve analysis times, and to enable sampling of larger data sets.

Operation 304 depicts determining the types of sampled data. Type determination may involve identifying integral values, dates, zip codes, state names, and so forth. Embodiments may perform type determination as a preliminary step in determining possible dimensions. For example, determining that a column in a sample data set is of a "date" type would suggest that the data belongs in a time dimension. There may, however, be a number of possible time dimensions for any given set of time-based data. Embodiments may therefore seek to identify additional characteristics or associations between the time column and other data in order to identify possible dimensions. For example, time in a "sales" table might correspond to the time of sale, while a time column in a "schedule" table might correspond to the time of an event.

Operation 306 depicts determining categories for data. This may involve matching elements of sampled data to potential categories. For example, an embodiment might identify "time of sale" as a dimension, and then determine what categories might accurately represent the data. For example, a "time of sale" column might suggest days, weeks, months, years, decades, and so on. This step may be a precursor to determining a hierarchy for the data.

Operation 308 may involve may involve incorporating additional information, including information from various reference sources, previous patterns of use, information shared from other applications, and so forth, to suggest what dimensions and hierarchies should be considered. A cross reference between identified types and categories and one or more reference sources may be performed. Reference sources may, for example, be used to identify certain types or categories that correspond to known dimensions and hierarchies.

Operation 310 depicts candidate modeling and scoring. The operations involving type determination, category determination, and reference source incorporation may result in a number of candidate dimensions and candidate hierarchies. For each candidate dimension, there may be a number of candidate hierarchies. The various candidates may be evaluated and scored based on various criteria. Previously used dimension and hierarchy models may be used to influence the scores—for example, a previously used model might score more highly than new models, based at least in part on its previous use.

Scoring of a model may involve determining a degree of fit between the proposed model and the sampled data. In cases where a provider of a hosted analytics application also maintains hosted transaction data, a larger data set may be employed by evaluating the data in situ.

Operation 312 depicts proposing a candidate model and receiving an acceptance of the candidate model. Proposal of the model may involve transmitting and displaying information indicative of the proposed dimensions and hierarchies to a publisher, developer, or user of a hosted analytics application.

Figure 3B:
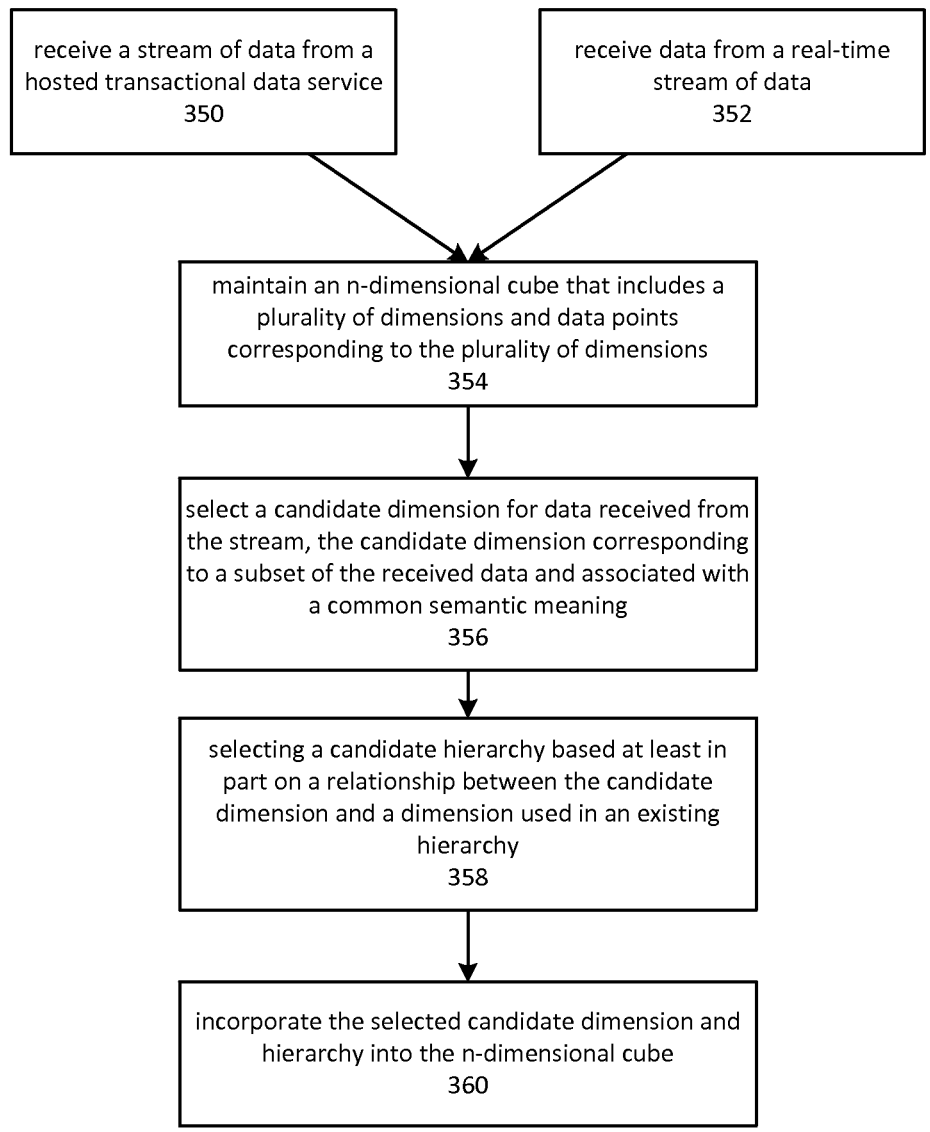
FIG. 3B is a flowchart depicting an embodiment of a process for automated detection and incorporation of a hierarchy in a hosted analytics environment.

FIG. 3B is a flowchart depicting an embodiment of a process for automated detection and incorporation of a hierarchy in a hosted analytics environment. Although depicted as a sequence of operations, those of ordinary skill in the art will appreciate that the depicted order should not be construed as limiting the scope of the present disclosure and that at least some of the depicted operations may be altered, omitted, reordered, supplemented with additional operations, or performed in parallel. Embodiments of the depicted process may be implemented using various combinations of computer-executable instructions executed by a computing system, such as the computing systems described herein.

Operations 350 and 352 depict receiving streams of data on which analytical operations may be performed. In some embodiments, as depicted by operation 350, a stream of data may be received from a hosted transactional data service. The hosted transactional data service may be hosted in situ, which is to say may be co-located with a hosted analytics service. The hosted transactional data service might also be operated at a remote location by the same provider as the hosted analytics service, or operated remotely by a third party. In some embodiments, as depicted by operation 352, data may be received from a stream of real-time data, such as log data, news feeds, massively multiplayer games, and various cloud services.

The data received from various data streams may be incorporated into an n-dimensional cube for subsequent analysis, such as might be performed using OLAP queries. As depicted by operation 354, embodiments may maintain an n-dimensional cube that includes a plurality of dimensions and data points that correspond to intersections of those dimensions. Data incoming from various data streams may be incorporated into the n-dimensional cube. In some cases, a new dimension of data may be identified in a data stream, and embodiments may perform operations, as described herein, for detecting and incorporating the dimension and an appropriate hierarchy into the n-dimensional cube.

As depicted by operation 356, embodiments may select a candidate dimension for data received from a data stream. The candidate dimension may correspond to a subset of the data, where data in the subset is associated with a common semantic meaning. Using columnar data as an example, semantic meaning may include data corresponding to a particular column. In various unstructured and semi-structured data streams, semantic meaning may include logically related groups of data, such as ordinal data, dates and times, cost figures, and so on. Semantic meaning may be inferred based in part on various dictionaries, ontological graphs, and so forth. In various cases and embodiments, these dictionaries, ontological graphs, and so forth may be published in a data analytics marketplace by third parties, and then incorporated into a data analytics platform.

Data incoming from a data stream may be analyzed using dictionaries, ontological graphs, and so forth in order to identify semantic meanings associated with the incoming data and to identify a subset of the data, such as a column of data, that is a candidate dimension. A candidate dimension may correspond to a subset of data from a data stream, sharing a common semantic meaning, which may be selected for incorporation into an n-dimensional cube. Candidate dimensions may be scored or otherwise evaluated for inclusion based on various factors such as patterns of use. In some cases and embodiments, certain categories of dimensions (such as dates, sales figures, and so forth), may be commonly used by a particular customer of a hosted analytics service, for customers involved in a particular field of use, or in general. Embodiments may incorporate statistics related to these factors into selection mechanisms. For example, an embodiment might traverse an ontological graph weighted by factors including usage frequency of a particular dimension, where frequency of use by the customer, in the field of use, or in general are weighted in decreasing order. These and similar operations may be described as categorization operations.

Operation 358 depicts an embodiment selecting a candidate hierarchy based at least in part on a relationship between the candidate dimension and a dimension used in an existing hierarchy. The existing hierarchy may be one used by the customer of the hosted analytics service for whom the candidate dimension is being created or by another customer of the hosted analytics service. The existing hierarchy may be one which is defined in a collection of dimension and hierarchy models. The dimensions and hierarchies in a collection may be included based on their relationship to a particular field of use. A customer of a hosted analytics service might, for example, link his service to various collections related to the particular industry in which the customer operates.

In various embodiments, a candidate hierarchy may be selected by identifying related dimensions or hierarchies that are related but are of different dimension types. For example, geographic data may be received in real time from a mobile device. A related dimension might comprise a hierarchy of sales data, where the hierarchy is based on geographical information and comprises the geographic data received in real time.

Operation 360 depicts incorporating the selected candidate dimension and hierarchy into the n-dimensional cube. Incorporation of the selected candidate dimension and hierarchy may comprise calculating a dependency graph for data points related to the dimension and hierarchy. For example, dependencies may be calculated for data points corresponding to the intersections of existing dimensions and the newly added candidate dimension. Incorporation of the hierarchy may also involve, in some embodiments, determining dependency information for aggregate values implied by the hierarchy.

Figure 3C:
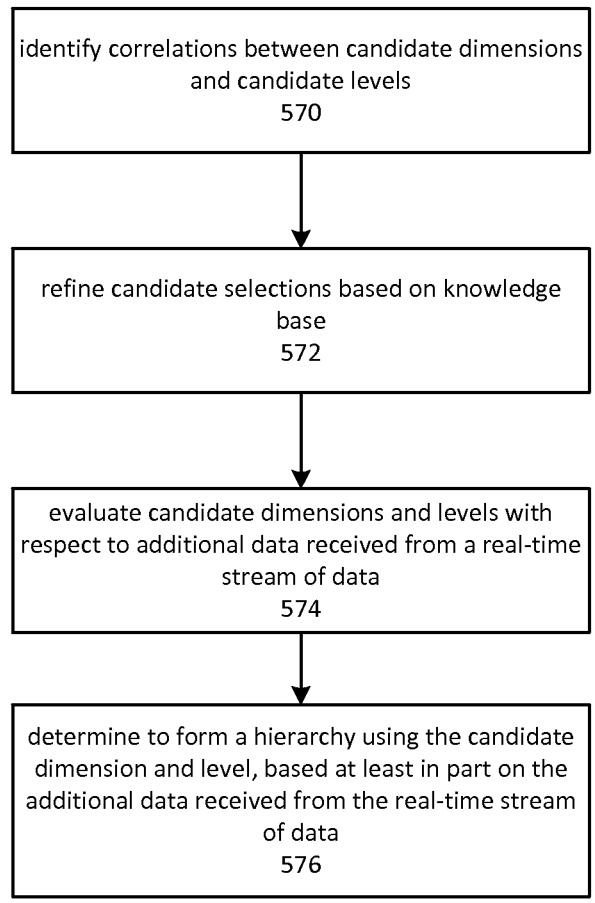
FIG. 3C is a flowchart depicting an embodiment of a process for automated detection and incorporation of a hierarchy in a hosted analytics environment, utilizing correlation between candidate dimensions, candidate levels, and data received from a real time stream of information.

FIG. 3C is a flowchart depicting an embodiment of a process for automated detection and incorporation of a hierarchy in a hosted analytics environment, utilizing correlation between candidate dimensions, candidate levels, and data received from a real time stream of information. Although depicted as a sequence of operations, those of ordinary skill in the art will appreciate that the depicted order should not be construed as limiting the scope of the present disclosure and that at least some of the depicted operations may be altered, omitted, reordered, supplemented with additional operations, or performed in parallel. Embodiments of the depicted process may be implemented using various combinations of computer-executable instructions executed by a computing system, such as the computing systems described herein.

An aspect of the present disclosure may involve identifying correlations between candidate dimensions and candidate levels for a hierarchy that may be formed. A hierarchy formed in this manner may reflect natural hierarchies that may exist within transactional data sets but may not be explicitly defined. There may, however, be various characteristics of the data, schema associated with the data, and queries used to access the data that may be utilized to identify undefined hierarchies.

As depicted by operation 570, embodiments may identify correlations between candidate dimensions and candidate levels. In some cases and embodiments, correlations may be detected based on repeated confluence of a candidate dimension and a candidate level. For example, pairs of values that frequently occur together may indicate a relationship between the two values that is indicative of a hierarchy. Embodiments may gauge a degree of correspondence based on various statistical measures, such as the number of times a confluence of a candidate dimension and level occurs compared to the number of times a candidate dimension or level occurs independently.

A similar inference may be made based on schema such as column names. For example, if columns A+B frequently occur together in a number of tables in a transactional database system, it could be the case that A and B have a hierarchical relationship. For example, column A could be defined as a "sales" column and column "B" could be defined as a "sales quarter" column, which may suggest that a hierarchy of sales figures could comprise a quarter dimension. In some cases and embodiments, correlation between candidate dimensions and candidate levels may be identified based on queries associated with transactional data. Queries executed against a transactional database management system may be used to identify correlated candidate dimensions and levels. One non-limiting example involves aggregation clauses, such as a SQL language clause specifying a summation or average. A candidate dimension might be identified from the fields being aggregated, and the level identified based on the means by which the fields included in the aggregate are limited. Accordingly, in an embodiment a correlation between potential hierarchy dimensions and levels may be inferred from an aggregation clause in a database query language such as SQL.

Operation 572 depicts refining selections of candidate dimensions and candidate levels based on a knowledge base. Various fact tables may be employed in a supplementary fashion to improve the identification of candidate dimensions and candidate levels. A knowledge base may comprise mappings of various names to dimensions or levels that may typically be associated with those names. A knowledge base may, in some embodiments, comprise information about which hierarchy types (including the corresponding dimensions and levels) have been previously employed by a user or users of a hosted analytics platform.

As depicted by operation 574, embodiments may evaluate candidate dimensions and levels with respect to additional data received from a real time stream of data. An example of a real time stream of data may include data transmitted from a mobile device, which may include descriptive information about the mobile device, geographic location, information about a user of the device, and so on. Embodiments may identify or refine selection of candidate dimensions and levels, using data received from a real time stream, in a number of ways. In some cases and embodiments, the received data may be used to identify a particular dimension, attribute value, level, and so on that might be of particular interest. For example, an embodiment might receive, from a real time stream of data, information indicating that a particular user is in a particular geographic location. Dimensions or levels related to or including the geographic location may be evaluated as better candidates to use in forming a hierarchy based on their relationship with the geographic location. In some cases, the geographic information may help link what might otherwise be seen as unrelated dimensions.

Operation 576 depicts determining to form a hierarchy using the candidate dimension and candidate level, based at least in part on the additional data received from the real time stream. Information received from the real time stream may be used to determine which dimensions and levels to use in constructing a hierarchy, as well as in determining whether or not to construct a given hierarchy that comprises a candidate dimension and level. For example, an embodiment might receive a real time stream of information comprising geographic location information for a number of devices. If a high proportion of the devices are located in the same general geographic location, hierarchies associated with the location might be prioritized for computation.

Figure 4:
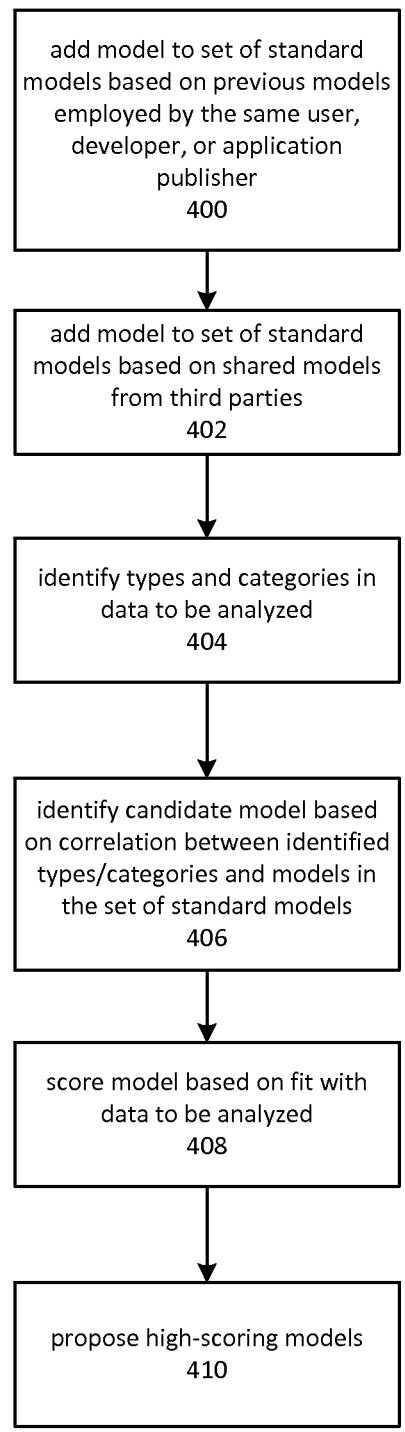
FIG. 4 is a flowchart depicting an embodiment of a process for identifying dimension and hierarchy models based on a set of standard models.

FIG. 4 is a flowchart depicting an embodiment of a process for identifying dimension and hierarchy models based on a set of standard models. Although depicted as a sequence of operations, those of ordinary skill in the art will appreciate that the depicted order should not be construed as limiting the scope of the present disclosure and that at least some of the depicted operations may be altered, omitted, reordered, supplemented with additional operations, or performed in parallel. Embodiments of the depicted process may be implemented using various combinations of computer-executable instructions executed by a computing system, such as the computing systems described herein.

Operation 400 depicts adding a model to a set of dimension and hierarchy models based on models previously employed by a user, developer, application publisher, and the like. A set of dimension and hierarchy models may be maintained based on models included in the set having been previously used by a user, developer, or publisher of a hosted analytics application.

Operation 402 depicts adding a model to a set of standard models based on dimension and hierarchy models shared by third parties, such as other users, developers, or publishers of hosted analytics applications.

At operation 404, the types and categories of sampled and probed data may be determined. At operation 406, candidate models may be selected based on correlation between the identified types and dimensions and models in the set of standard models.

Information may be stored in the set of models that is indicative of a relationship between a model in the set of standard models and the current user, developer, or application publisher. The closeness of the relationship may be indicative of the likelihood that a model in the set of standard models will be relevant to a new application. Embodiments may base the selection of proposed models, as depicted by operation 406, based partly on this information. A similar approach may be employed with respect to models provided by third parties. For example, a third party in the same industry may be more likely to provide relevant dimension and hierarchy models than a third party in an unrelated industry.

Operation 408 depicts scoring a model based on a fit between the model and the data to be analyzed. "Fit" may be defined as the degree to which data can be organized according to the proposed dimension and hierarchy. For example, a given piece of data might belong to a category of data that correlates well to a proposed member of a hierarchy, in which case the fit may be considered to be relatively good. If a given piece of data belongs to a category that does not fit any member of a proposed hierarchy, the fit may be considered to be relatively poor.

At operation 410, a high-scoring model may be proposed as a candidate set of dimensions and hierarchies to be employed in subsequent analysis. Proposing a candidate may involve transmitting information indicative of the model to a user, developer, or publisher of a hosted analytics application. In some embodiments, proposing a candidate may be indicative of performing further automated analysis, such as performing automated data mining using the model.

Figure 5A:
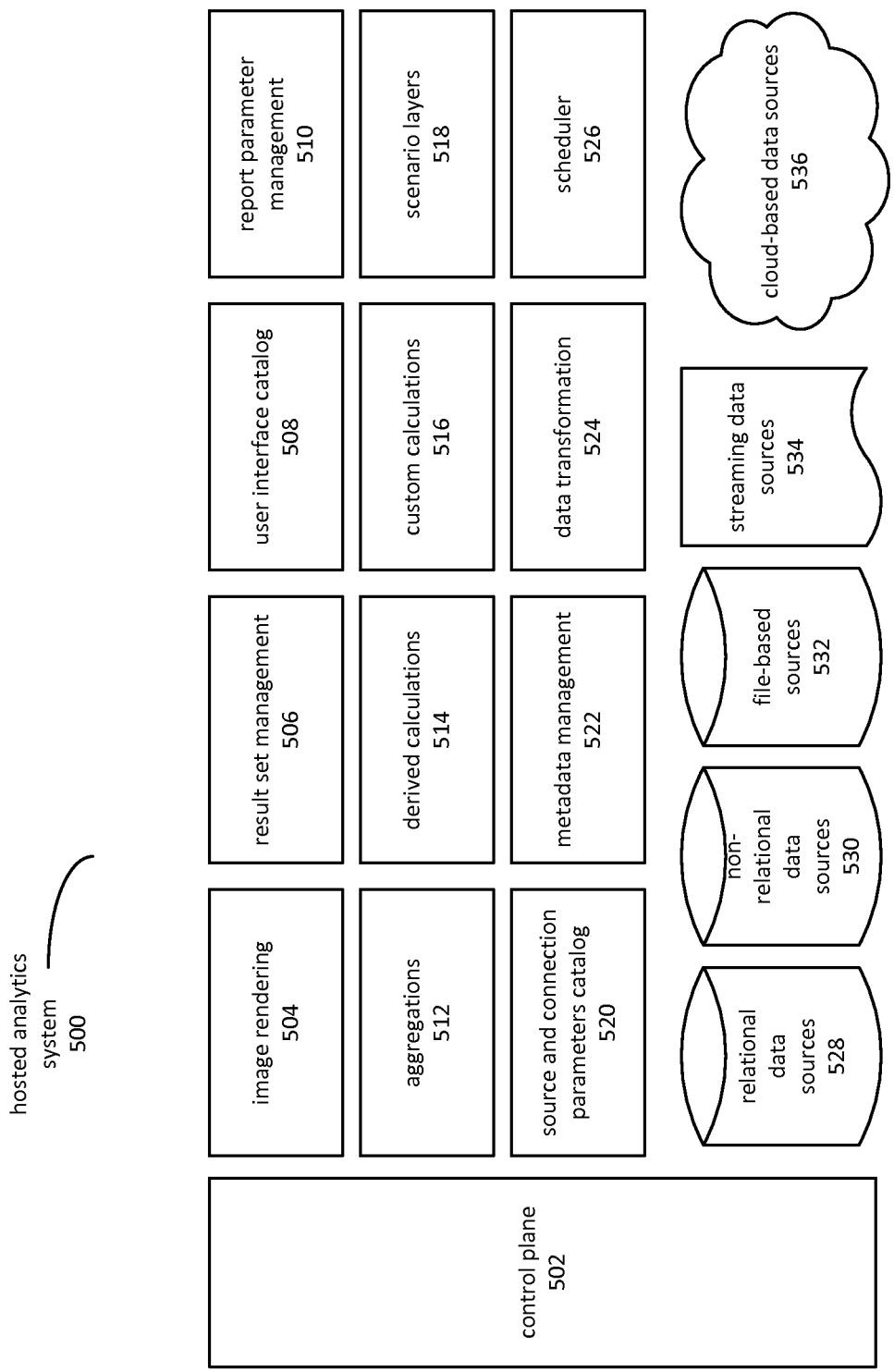
FIG. 5A is a block diagram depicting an embodiment of a system for providing hosted analytics services.

FIG. 5A is a block diagram depicting an embodiment of a system for providing hosted analytics services. A hosted analytics system 500 may be managed by a control plane 502 that coordinates activities of various modules of the system.

An image rendering 504 module may provide rendering services for embedded user-interface components, such as graphs and charts. A result set management 506 module may maintain history information, data caches, and so forth pertaining to results of performing an analysis. A user interface catalog 508 module may maintain a repository of user interface elements for embedded analytics, such as images and so forth, that might be inserted in the user interface of an application that includes embedded analytics features. A report parameter management 510 module may comprise a repository of parameters to be used in generating analytical reports, such as time periods, geographic region, dimensions to include in a report, desired drill-down levels, and so on.

An aggregations 512 module may perform operations to calculate aggregate values in various dimensions and combinations of dimensions. For example, aggregations 512 module may calculate monthly, weekly, and daily sales data for a particular store, geographic region, and state.

A derived calculations 514 module may perform second-order calculations based on aggregate data and other information. A custom calculations 516 module may perform report-specific or user-provided calculations. Custom calculations may be provided, for example, by an application publisher.

A scenario layers 518 module may perform operations related to simulations, projections, or other types of "what-if" scenarios. These may be custom scenarios provided, for example, by an application publisher.

A source and connection parameters catalog 520 may maintain information used to locate and connect to various information sources. Information for locating sources may include network address, uniform resource locators ("URLs"), and so forth. Information for connecting may include various forms of credentials, accounts, user names, and so forth.

A metadata management 522 module may maintain various forms of metadata and other information used in interfacing with various data sources, such as relational data sources 528, non-relational data sources 530, file-based sources 532, streaming sources 534, and cloud-based data sources 536. Embodiments may employ metadata from metadata management 522 module in conjunction with data transformation 524 module. Data transformation 524 module may perform data transformation and data cleansing operations on incoming data.

A scheduler 526 module may coordinate timing of various activities performed by hosted analytics system 500. The coordination may involve scheduling n-dimensional cube rebuilding, scheduling data retrieval, and so forth.

Various data sources may be employed. These include relation data sources 528, such as SQL-based relational database management systems, as well as non-relational data sources 530. Various non-relational data sources 530 may include NoSQL database systems, key-value pair databases, object-relational databases, and so forth. Various file-based sources 532 may be used, such as document repositories, log files and so forth. Log files may also be treated as streaming data sources 534, which may also include other types of data sources where data may be updated on an ongoing basis. Another example that may be categorized with other streaming data sources 534 is data generated from videogames, such as multi-player video games.

Various types of cloud-based data sources 536 may be used. These may include various web sites or data sources maintained by a provider of hosted analytics services, an application publisher, a user of an application, or a third party.

Figure 5B:
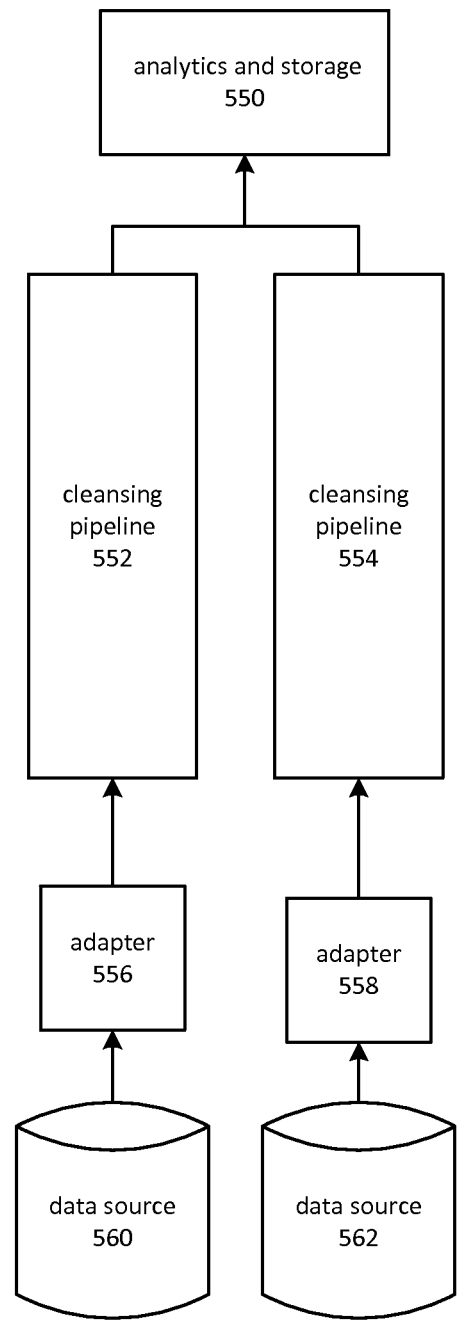
FIG. 5B depicts a process for intake and processing of data from real-time data sources.

FIG. 5B depicts a process for the intake and processing of data from real-time data sources. A data source 560 may be communicatively coupled to an adapter 556 and a cleansing pipeline 552. Additional data sources, such as data source 562, may be communicatively coupled to other adapters and pipelines, such as adapter 558 and cleansing pipeline 554.

An adapter 556 may transform data from data source 560 to a format suitable for processing by cleansing pipeline 552. Operations performed by cleansing pipeline 552 may include performing one or more translations or transformations on incoming data. Examples include stemming, lemmatisation, and so forth. A cleansing pipeline 552 may be multiplexing. This may include performing cleansing along multiple paths in order to produce data in a normalized format that matches a normalized format used in each destination n-dimensional cube.

FIG. 5B depicts an analytics and storage 550 module. This may refer to various components for performing analytics, such as modules 502-526 in FIG. 5A. Cleansed data incoming from cleansing pipelines 552 and 554 might be processed by an analytics and storage 550 module. The processing might include operations, such as performing aggregation, performing custom calculations, scenario modeling, and so forth. Data from cleansing pipelines 552 and 554, as well as any calculated or derived values, may be routed and stored in an appropriate n-dimensional cube.

Embodiments of the present disclosure may be employed in conjunction with many types of database management systems ("DBMSs"). A DBMS is a software and hardware system for maintaining an organized collection of data on which storage and retrieval operations may be performed. In a DBMS, data is typically organized by associations between key values and additional data. The nature of the associations may be based on real-world relationships that exist in the collection of data, or it may be arbitrary. Various operations may be performed by a DBMS, including data definition, queries, updates, and administration. Some DBMSs provide for interaction with the database using query languages, such as structured query language ("SQL"), while others use APIs containing operations, such as put and get and so forth. Interaction with the database may also be based on various protocols or standards, such as hypertext markup language ("HTML") and extended markup language ("XML"). A DBMS may comprise various architectural components, such as a storage engine that acts to store data on one or more storage devices, such as solid-state drives.

Figure 6:
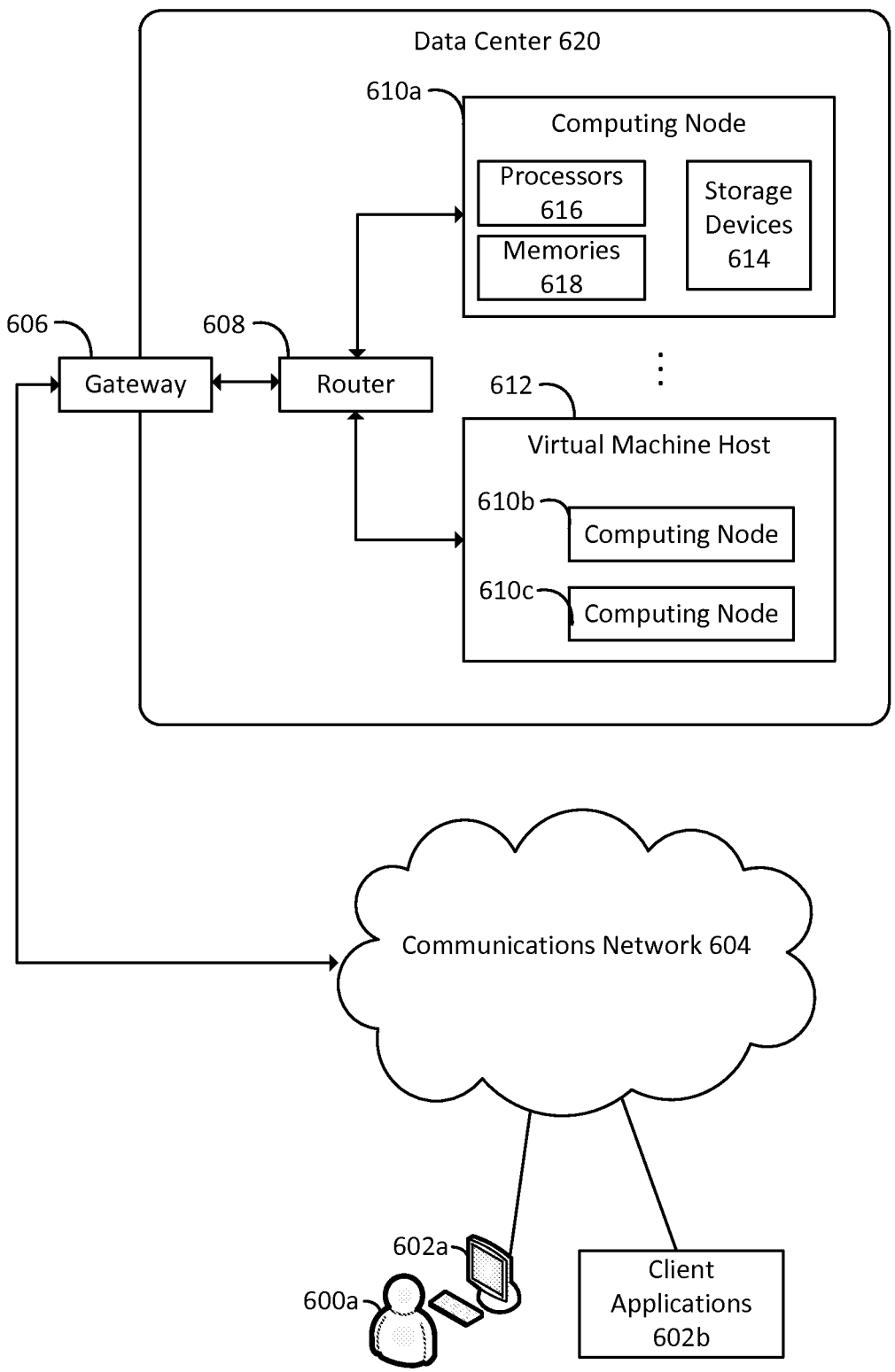
FIG. 6 is a block diagram depicting an embodiment of a computing environment in which aspects of the present disclosure may be practiced.

FIG. 6 is a diagram depicting an example of a distributed computing environment on which aspects of the present invention may be practiced. Various users 600a may interact with various client applications, operating on any type of computing device 602a, to communicate over communications network 604 with processes executing on various computing nodes 610a, 610b, and 610c within a data center 620. Alternatively, client applications 602b may communicate without user intervention. Communications network 604 may comprise any combination of communications technology, including the Internet, wired and wireless local area networks, fiber optic networks, satellite communications, and so forth. Any number of networking protocols may be employed.

Communication with processes executing on the computing nodes 610a, 610b, and 610c, operating within data center 620, may be provided via gateway 606 and router 608.

Numerous other network configurations may also be employed. Although not explicitly depicted in FIG. 6, various authentication mechanisms, web service layers, business objects, or other intermediate layers may be provided to mediate communication with the processes executing on computing nodes 610a, 610b, and 610c. Some of these intermediate layers may themselves comprise processes executing on one or more of the computing nodes. Computing nodes 610a, 610b, and 610c, and processes executing thereon, may also communicate with each other via router 608. Alternatively, separate communication paths may be employed. In some embodiments, data center 620 may be configured to communicate with additional data centers, such that the computing nodes and processes executing thereon may communicate with computing nodes and processes operating within other data centers.

Computing node 610a is depicted as residing on physical hardware comprising one or more processors 616, one or more memories 618, and one or more storage devices 614. Processes on computing node 610a may execute in conjunction with an operating system or alternatively may execute as a bare-metal process that directly interacts with physical resources, such as processors 616, memories 618, or storage devices 614.

Computing nodes 610b and 610c are depicted as operating on virtual machine host 612, which may provide shared access to various physical resources, such as physical processors, memory, and storage devices. Any number of virtualization mechanisms might be employed to host the computing nodes.

The various computing nodes depicted in FIG. 6 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 7:
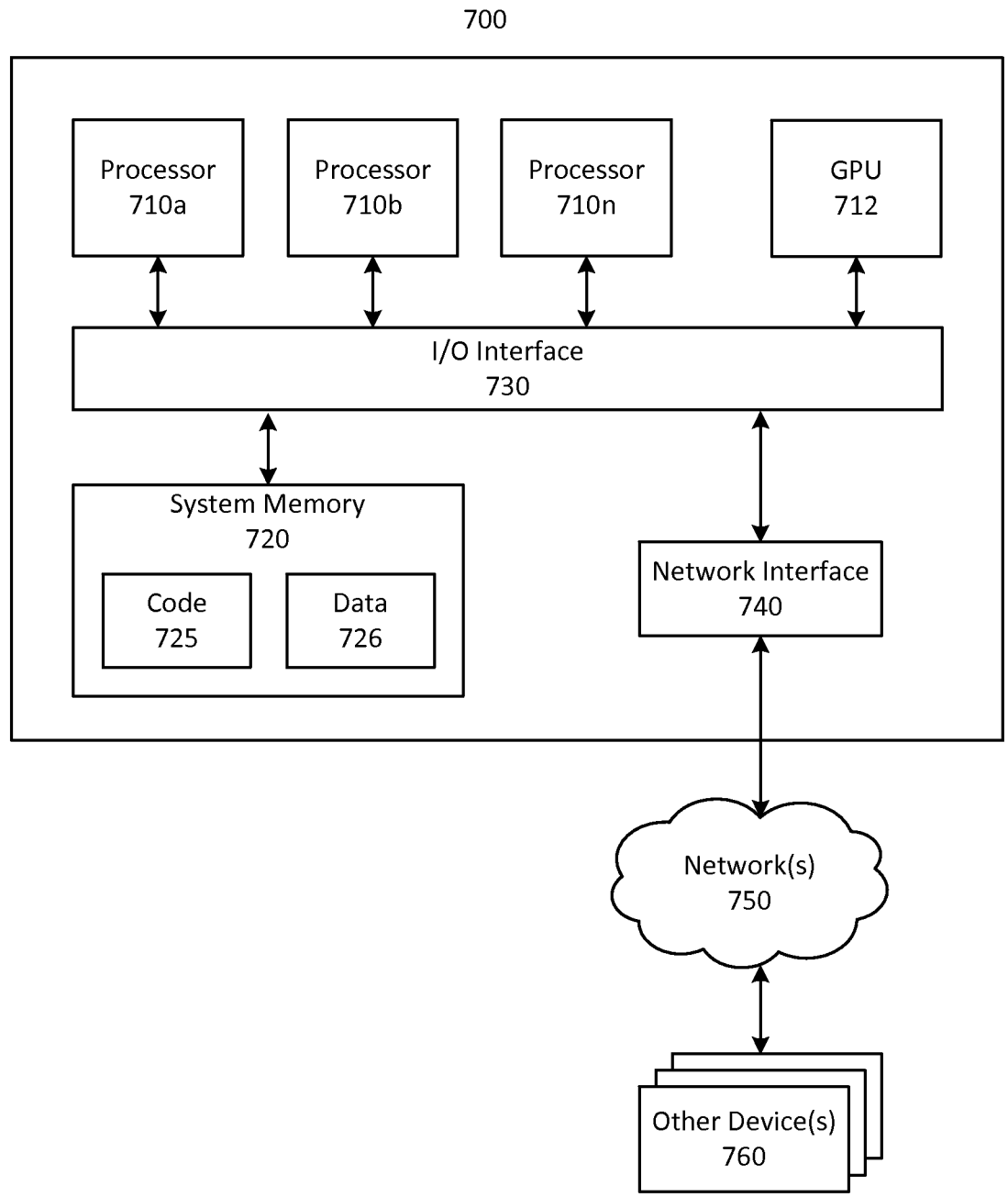
FIG. 7 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 7 depicts a general-purpose computer system that includes or is configured to access one or more computer-accessible media. In the illustrated embodiment, computing device 700 includes one or more processors 710a, 710b, and/or 710n (which may be referred herein singularly as a processor 710 or in the plural as the processors 710) coupled to a system memory 720 via an input/output (I/O) interface 730. Computing device 700 further includes a network interface 740 coupled to I/O interface 730.

In various embodiments, computing device 700 may be a uniprocessor system including one processor 710 or a multiprocessor system including several processors 710 (e.g., two, four, eight, or another suitable number). Processors 710 may be any suitable processors capable of executing instructions. For example, in various embodiments, processors 610 may be general-purpose or embedded processors implementing any of a variety of instruction set architectures (ISAs), such as the x86, PowerPC, SPARC, or MIPS ISAs or any other suitable ISA. In multiprocessor systems, each of processors 610 may commonly, but not necessarily, implement the same ISA.

In some embodiments, a graphics processing unit ("GPU") 712 may participate in providing graphics rendering and/or physics processing capabilities. A GPU may, for example, comprise a highly parallelized processor architecture specialized for graphical computations. In some embodiments, processors 710 and GPU 712 may be implemented as one or more of the same type of device.

System memory 720 may be configured to store instructions and data accessible by processor(s) 610. In various embodiments, system memory 720 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques and data described above, are shown stored within system memory 720 as code 725 and data 726.

In one embodiment, I/O interface 730 may be configured to coordinate I/O traffic between processor 710, system memory 720, and any peripherals in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 610). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 620, may be incorporated directly into processor 710.

Network interface 740 may be configured to allow data to be exchanged between computing device 700 and other device or devices 760 attached to a network or networks 750, such as other computer systems or devices, for example. In various embodiments, network interface 740 may support communication via any suitable wired or wireless general data networks, such as types of Ethernet networks, for example. Additionally, network interface 740 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 720 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 700 via I/O interface 730. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 700 as system memory 720 or another type of memory. Further, a computer-accessible medium may include transmission media or signals, such as electrical, electromagnetic or digital signals, conveyed via a communication medium, such as a network and/or a wireless link, such as those that may be implemented via network interface 740. Portions or all of multiple computing devices, such as those illustrated in FIG. 7, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages—such as Ruby, Perl, Python, C, C++, and the like—or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage, and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems (OS) and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate device or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system for performing analytics on transactional data in conjunction with real time information, the system comprising:
    one or more memories having stored thereon computer-readable instructions that, upon execution by one or more computing devices, cause the system at least to:
        select a candidate dimension for inclusion in a hierarchy to be stored in an n-dimensional cube, based at least in part on identifying a correlation between the candidate dimension and a candidate level for the hierarchy, the correlation identified based at least in part on a repeated confluence of the candidate dimension and candidate level in at least one of a schema of a dataset of transactional data or queries of the transactional data;
        generate a hierarchy comprising the candidate dimension and the candidate level, the hierarchy stored in response to receiving, from a real time stream of data, data that is related to at least one of the candidate dimension or the candidate level; and
        store the hierarchy in the n-dimensional cube.

2. The system of claim 1, further comprising one or more memories having stored thereon computer-readable instructions that, upon execution by the one or more computing devices, cause the system at least to:
    identify the correlation based at least in part on the query associated with the dataset, wherein the query comprises an aggregation clause from which the candidate dimension and the candidate level are inferred.

3. The system of claim 1, further comprising one or more memories having stored thereon computer-readable instructions that, upon execution by the one or more computing devices, cause the system at least to:
identify the correlation based at least in part on a first frequency that the candidate dimension and the candidate level occur together in the dataset compared to a second frequency that the candidate dimension and the candidate level occur independently.

4. The system of claim 1, wherein the data received from the real time stream of data comprises at least one of a current geographic location of a user or device information.

5. The system of claim 1, further comprising one or more memories having stored thereon computer-readable instructions that, upon execution by the one or more computing devices, cause the system at least to:
identifying a repeated confluence of the candidate dimension and the candidate level in the schema associated with the dataset.

6. The system of claim 1, further comprising one or more memories having stored thereon computer-readable instructions that, upon execution by the one or more computing devices, cause the system at least to:
store the hierarchy by at least calculating dependency information for a data point in the hierarchy to be stored in the n-dimensional cube and prioritizing computation of the data point.

7. A computer-implemented method comprising:
selecting a first dimension for inclusion in a hierarchy to be stored in an n-dimensional cube associated with transactional data, the selecting based at least in part on identifying a correlation between the first dimension and a first level, the correlation identified based at least in part on repeated confluence of the first dimension and the first level in at least one of a dataset of transactional data or queries of the transactional data;
generating the hierarchy comprising the first dimension and the first level, the hierarchy stored in response to receiving additional data that is related to at least one of the first dimension or the first level; and
storing the hierarchy in the n-dimensional cube.

8. The method of claim 7, further comprising:
identifying the correlation based at least in part on the query associated with the dataset, wherein the query comprises an aggregation clause from which the first dimension and the first level are inferred.

9. The method of claim 7, further comprising:
identifying the correlation based at least in part on a repeated confluence of an aggregate of a plurality of fields associated with the first dimension and a limitation on the fields included in the first level in the dataset.

10. The method of claim 7, wherein the additional data comprises at least one of a current geographic location of a user or device information.

11. The method of claim 7, further comprising:
identifying a repeated confluence of the first dimension and the first level in a schema associated with the dataset.

12. The method of claim 7, further comprising:
forming the hierarchy by at least calculating dependency information for a data point in the hierarchy and prioritizing computation of the data point.

13. The method of claim 7, further comprising:
selecting at least one of the first dimension or the first level based at least in part on a collection of information indicative of hierarchies used by a hosted analytics service.

14. A non-transitory computer-readable storage medium having stored thereon instructions that, upon execution by one or more computing devices, cause the one or more computing devices at least to:
select a first dimension for inclusion in a hierarchy to be stored in an n-dimensional cube, the selection based at least in part on identification of a correlation between the first dimension and a first level, the correlation identified based on at least one of repeated confluence of the first dimension and the first level in a schema of a dataset, or repeated confluence of the first dimension and the first level in a plurality of queries of the dataset;
generate a hierarchy comprising the first dimension and the first level, the hierarchy generated in response to receiving additional data that is related to at least one of the first dimension or the first level; and
store the hierarchy in the n-dimensional cube.

15. The non-transitory computer-readable storage medium of claim 14, comprising further instructions that, upon execution by the one or more computing devices, cause the one or more computing devices to at least:
identify the correlation based at least in part on the query associated with the dataset, wherein the query comprises an aggregation clause from which the first dimension and the first level are inferred.

16. The non-transitory computer-readable storage medium of claim 14, comprising further instructions that, upon execution by the one or more computing devices, cause the one or more computing devices to at least:
identify the correlation based at least in part on a repeated confluence of the first dimension and the first level in the dataset.

17. The non-transitory computer-readable storage medium of claim 14, wherein the additional data comprises at least one of a current geographic location of a user or device information.

18. The non-transitory computer-readable storage medium of claim 14, comprising further instructions that, upon execution by the one or more computing devices, cause the one or more computing devices to at least:
select the first dimension and the first level based at least in part on a repeated confluence of elements associated with the first dimension occurring together and the first level in the schema associated with the dataset.

19. The non-transitory computer-readable storage medium of claim 14, comprising further instructions that, upon execution by the one or more computing devices, cause the one or more computing devices to at least:
store the hierarchy by at least calculating dependency information for a data point in the hierarchy and prioritizing computation of the data point.

20. The non-transitory computer-readable storage medium of claim 14, comprising further instructions that, upon execution by the one or more computing devices, cause the one or more computing devices to at least:
adjust a priority for computing data points of the hierarchy based on the additional data.

* * * * *